(12) United States Patent
Avakian et al.

(10) Patent No.: US 6,362,258 B1
(45) Date of Patent: Mar. 26, 2002

(54) STABILIZED THERMOPLASTIC POLYMER COMPOSITION

(75) Inventors: Roger W. Avakian, Parkersburg, WV (US); Henry C. Ashton, Harris, TX (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 08/578,155

(22) Filed: Dec. 29, 1995

(51) Int. Cl.[7] .................................................. C08K 5/34
(52) U.S. Cl. ........................ 524/100; 524/151; 524/153; 524/310; 524/377; 524/388; 524/249; 524/493
(58) Field of Search ............................. 524/153, 151, 524/377, 310, 387, 388, 400, 100, 249

(56) References Cited

U.S. PATENT DOCUMENTS

| | | | | |
|---|---|---|---|---|
| 3,222,314 A | * | 12/1965 | Wolinski | 524/377 |
| 3,658,744 A | * | 4/1972 | Brindell et al. | 524/377 |
| 3,904,565 A | | 9/1975 | Yoshiura et al. | |
| 4,251,407 A | * | 2/1981 | Schroeder et al. | 524/400 |
| 4,366,280 A | | 12/1982 | Yukawa | |
| 4,425,464 A | * | 1/1984 | Allen et al. | 524/400 |
| 4,430,488 A | * | 2/1984 | Zboril | 524/400 |
| 4,504,615 A | * | 3/1985 | Mills | 524/387 |
| 4,810,579 A | * | 3/1989 | Neri et al. | 428/405 |
| 4,863,981 A | * | 9/1989 | Gugumus | 524/100 |
| 5,378,747 A | * | 1/1995 | Das et al. | 524/387 |
| 5,559,176 A | * | 9/1996 | Namba et al. | 524/377 |

FOREIGN PATENT DOCUMENTS

| | | |
|---|---|---|
| EP | 0 400 454 A2 | 12/1990 |
| EP | 0 492 463 A2 | 7/1992 |
| EP | 0 725 107 A1 | 8/1996 |
| GB | 2 260 764 A | 4/1983 |
| GB | 2 278 362 | 11/1994 |
| JP | 60-80830 | 3/1994 |

OTHER PUBLICATIONS

Journal of Applied Polymer Science, vol. 29, 4421–4426 (1984).*
Harlin, Ali–"Thermal . . . Systems"—Polymer Degradation & Stability, 42, 89–94 (1993).*
Klender, G.J. et al "Antioxidant . . . Polymers" ANTEC '85, 989–996.*

* cited by examiner

Primary Examiner—Veronica P. Hoke

(57) ABSTRACT

A thermoplastic polymer composition includes a polyolefin polymer, silica; a phosphorus-containing antioxidant compound; and a co-additive that includes one or more of (i) a polyalkylene glycol having a number average molecular weight of greater than or equal to 3,000, (ii) a polyalkylene oxide, (iii) a sterically hindered amine compound.

31 Claims, No Drawings

STABILIZED THERMOPLASTIC POLYMER COMPOSITION

FIELD OF THE INVENTION

The present invention relates to a stabilized thermoplastic polymer composition.

DESCRIPTION OF THE RELATED ART

It is well known to formulate polyolefin polymers with phosphorus-containing antioxidant-stabilizer additives, e.g., phosphites, phosphonites, to improve and preserve the properties of the polymer. It has been observed that silica-containing polyolefin polymers that are stabilized with phosphorus-containing additives exhibit a relatively rapid decrease in the amount of phosphorus-containing additive under conditions of elevated temperature and high relative humidity. The rapid disappearance of the phosphorus containing additive has given rise to a concern that the long term stability of phosphorus-containing additive stabilized polyolefin polymers compositions with respect to, e.g., melt index, may be compromised. What is needed is a technique by which the rate of disappearance of the phosphorus compound from the polyolefin polymer composition is slowed, without detrimentally affecting other properties, e.g., color, of the polyolefin polymer composition.

SUMMARY OF THE INVENTION

The present invention is directed to thermoplastic polymer composition, comprising:

a polyolefin polymer;

silica;

a phosphorus-containing antioxidant compound; and a co-additive, said co-additive comprising one or more of (i) a polyalkylene glycol having a number average molecular weight of greater than or equal to 3,000, (ii) a polyalkylene oxide, (iii) a sterically hindered amine compound.

The thermoplastic polymer composition of the present invention exhibits low color and exhibits a substantial decrease, relative to analogous compositions that lack the co-additive of the composition of the present invention, in the rate at which the phosphorus-containing antioxidant compound is consumed, i.e., disappears, from the composition, particularly under conditions of elevated temperature, high relative humidity or elevated temperature and high relative humidity.

Another aspect of the present invention is directed to a method for decreasing the rate of consumption of a phosphorus-containing antioxidant compound in a polyolefin polymer composition, wherein said polyolefin polymer composition initially comprises the phosphorus-containing antioxidant compound and silica, comprising: adding a co-additive to the polymer composition, said co-additive comprising one or more of: (i) a polyalkylene glycol having a number average molecular weight of greater than or equal to 3,000, (ii) a polyalkylene oxide, (iii) a sterically hindered amine compound, to the polyolefin polymer composition.

DETAILED DESCRIPTION OF THE INVENTION

Polyolefin Polymer

Polyolefin polymers and methods of making polyolefin polymers are well known in the art Suitable polyolefin polymers include polyolefin homopolymers, such as, e.g., polyethylene, polypropylene, polyisobutylene, and polyolefin copolymers such as, e.g., poly(ethylene-propylene) copolymer, poly(ethylene-butylene) copolymer as well as blends thereof. In a preferred embodiment, the polyolefin polymer is a high density polyethylene polymer, i.e., a high density polyethylene homopolymer or a high density polyethylene copolymer.

Suitable high density polyethylene polymers are made, e.g., by a process wherein ethylene is polymerized in a slurry system at low pressure (2 to 4 megaPascals (MPa)) and moderate temperature (90 to 150° C.) in a low boiling hydrocarbon, e.g., isobutane or isopentane, the presence of a catalyst that includes chromium in the Cr(VI) state and a powdered substrate of high surface area, e.g., porous amorphous silica. A chromium compound and silica are mixed together and heated in a stream of dry air to activate the catalyst. Homopolymerization using the chromium catalyzed process produces a polymethylene or very high molecular weight $\alpha$-olefin. Typical homopolymer made by the chromium catalyzed process has a weight average molecular weight of about 40,000 to about 1,000,000, a melt index, as measured by ASTM Method D 1238-5T, of from 0.01 grams to 20 grams per 10 minutes (g/10 min) at 190° C., a density of about 0.960 to about 0.965 grams per cubic centimeter ($g/cm^3$) and a crystallinity of about 94%. High density polyethylene copolymers containing units derived from other olefin monomers, e.g., 1-butene, 1-hexene, 1-octene, typically exhibit weight average molecular weights of from about 20,000 to about 1,000,000, melt indexes in the range of about 0.1 g to about 100 g/10 minutes and densities of from about 0.936 $g/cm^3$ to about 0.96 $g/cm^3$.

Suitable high density polyethylenes are commercially available from a number of commercial sources, including, e.g., Phillips, Union Carbide, BASF and Paxon Polymer Company.

The composition of the present invention may, optionally, further include one or more other polymers blended with the polyolefin polymer, e.g., a fluoropolymers added for the purpose of enhancing processability, at a level of up to about 500 parts by weight (pbw) of the other polymer per million pbw of the polyolefin polymer.

Silica

In a preferred embodiment, silica is present in the composition of the present invention at a level of from 20 ppm to 1000 ppm silica, based on the amount of polymer.

In one embodiment of the present invention, the silica component is introduced as a support for a polymerization reaction catalyst used in making the polymer. Typical catalyst compounds used for polymerization reactions include, e.g., chromium compounds, vanadium compounds, titanium compounds. Suitable silica supported chromium catalysts include, e.g., chromium trioxide/silica, chromocene/silica, hydrated chromium acetate/silica, bis(triphenyl silyl) chromate/silica. Typically, the silica catalyst support residue is present at a level of from 20 ppm to 500 ppm silica, based on the amount of polymer, i.e., parts by weight per one million parts by weight polymer.

Silica may also be introduced to the composition of the present invention, in the form of fumed silica, as an anti-block additive. Suitable anti-block additives are commercially available, e.g., from Cabot Corporation. The silica anti-block additives are typically used at a level of from 50 ppm to 1000 ppm silica, based on the amount of polymer.

While not wishing to be bound by theory, it is believed that silica present in prior art polymers is involved in the undesirably rapid disappearance of the phosphorus compound from the polymer, particularly when the polymers are exposed to conditions of elevated temperature, high relative humidity or elevated temperature and high relative humidity.

Phosphorus-containing Antioxidant Compound

Phosphorus-containing compounds suitable for use as antioxidants and stabilizers in polymer compositions are well known in the art. Suitable phosphorus-containing antioxidant compounds include organo-phosphorus compounds, e.g., phosphites and phosphonites, such as, e.g., triphenyl phosphite, diphenylalkyl phosphites, phenyldialkyl phosphites, tris(nonyl-phenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, 2,2-ethylidene bis(4,6-di-tert-butylphenyl)fluorophosphite, bis(2,4-di-tert-butylphenyl) pentaerythritol diphosphite, tristearyl sorbitol triphosphite, (2,4,6-tri-tert-butylphenyl)(2-butyl-2-ethyl-1,3-propanediol)phosphite, 2,2',2"-nitrilo[triethyl-tris[3,3',5,5'-tetra-tert-butyl-1,1'-biphenyl-2-2'-diyl]phosphite and tetrakis(2,4-di-tert-butylphenyl)4,4'-biphenylene diphosphonite.

In a preferred embodiment, the phosphorus compound is a phosphite compound and, more preferably, is tris(nonyl-phenyl)phosphite, (2,4,6-tri-tert-butylphenyl)(2-butyl-2-ethyl-1,3-propanediol)phosphite, bis(2,4-di-t-butylphenyl) pentaerythritol diphosphite or distearyl pentaerythritol diphosphite.

The phosphorus compound is, at least initially, present in an amount effective to improve the oxidative stability of the polymer. In a preferred embodiment, the composition of the present invention includes from 100 ppm to 2000 ppm, more preferably from 200 ppm to 1500 ppm, and still more preferably from 500 ppm to 1000 ppm, of the phosphorus-containing compound, based on the amount of polymer.

Neutralizer Compound

In a preferred embodiment, the composition of the present invention includes a neutralizer compound for neutralizing catalyst residues and other acidic residues derived from the polymer production method. Suitable neutralizer compounds are known and include, e.g., alkali metal salts and alkaline earth metal salts of fatty acids such as, e.g., zinc stearate, calcium stearate, calcium lactate, calcium stearoyl lactylate, metal oxides such as, e.g., zinc oxide, magnesium oxide, and epoxidized soybean oil.

In a preferred embodiment, the neutralizer compound is zinc stearate.

The neutralizer compound may be present in an amount effective to improve the stability of the polymer. In a preferred embodiment the composition of the present invention includes from 5 ppm to 2500 ppm, more preferably from 200 ppm to 1000 ppm, of the neutralizer compound, based on the amount of polymer.

Co-additive

The composition of the present invention includes a co-additive in an amount effective to decrease the rate of consumption of the phosphorus-containing antioxidant compound.

(i) Sterically Hindered Amine

Sterically hindered amines suitable for use as stabilizers in polymer compositions are known in the art. Suitable sterically hindered amines include, e.g., 1,4-diazobicyclo-2,2-octane, N,N,N',N'-tetramethyl hexamethylenediamine, triisopropanol amine, bis(2,2,4,6-tetramethyl-4-piperidyl)-sebacate, dodecyl-N-(2,2,4,6-tetramethyl-4-piperidinyl)-succinimide, 2,2,6,6-tetramethyl-4-piperidinol, imidazole, distearyl hydroxyl amine, polyethyleneimine, guanine, lysine, the reaction product of 2,4-dichloro-6-(4-morpholinyl)-1,3,5-triazine with a polymer of 1,6-diamine, N, N'-Bis(-2,2,4,6-tetramethyl-4-piperidenyl) hexane, poly [[6-[(1,1,3,3-tetramethylbutyl)amino-5-triazine-2,4-][(2,2, 6,6-tetramethyl-4-piperidyl)imino]hexamethylene[2,2,6,6-tetramethyl-4piperridyl) imino]], dimethyl succinate polymer with 4-hydroxy-2,2,6,6-tetramethyl-1-piperidine ethanol, poly(oxy-1,2-ethanediyl, α-[3-[3-(2H-benzotriazol-2-yl)-5-(1,1-dimethylethyl)-4-hydroxyphenyl-1-oxopropoxly-Ω-[3-[3-(2H-benzotriazol-2-yl)-5-(1, 1dimethylethyl)-4-hydroxyphenyl]-1-oxopropoxy], polymethyl-propyl-3-oxy-[4(2,2,6,6-tetramethyl) piperidinyl]siloxane.

In a preferred embodiment, the sterically hindered amine is triisopropanol amine or the reaction product of 2,4-dichloro-6-(4-morpholinyl)-1,3,5-triazine with a polymer of 1,6-diamine, N, N'-Bis(-2,2,4,6-tetramethyl-4-piperidenyl) hexane.

In a preferred embodiment, the composition of the present invention includes from 5 ppm to 200 ppm, more preferably from 10 to 100 ppm, and still more preferably from 25 ppm to 50 ppm of the sterically hindered amine, based on the amount of polymer.

(ii) Polyalkylene Glycol or Polyalkylene Oxide

Polyalkylene glycols, such as, e.g., polyethylene glycol, polypropylene glycol, and polyalkylene oxides, such as, e.g., polyethylene oxide, polypropylene oxide, are well known. The polyalkylene glycol of the present invention may be any polyalkylene glycol having a number average molecular weight ("$M_n$") of from equal to or greater than 3,000.

In a first preferred embodiment, the co-additive is a polyalkylene glycol having a $M_n$ of greater than or equal to 6000. In a second preferred embodiment, the co-additive is a polyalkylene glycol having a $M_n$ of from 8,000 to 8,000, 000. In a third preferred embodiment, the co-additive is a polyalklylene glycol having a $M_n$ of from 15,000 to 8,000, 000. In a fourth preferred embodiment, the co-additive is a polyalkylene oxide having a viscosity average molecular weight ("$M_v$") of greater than 50,000.

In a preferred embodiment, the composition of the present invention includes from 10 ppm to 500 ppm, more preferably from 25 ppm to 300 ppm, and still more preferably from 100 ppm to 300 ppm of the polyalkylene glycol or polyalkylene oxide, based on the amount of polymer.

(iii) Co-additive Mixtures

In one embodiment of the present invention, the co-additive includes a polyalkylene glycol and a polyalkylene oxide. In a preferred embodiment, the composition of the present invention includes from 10 ppm to 500 ppm, more preferably from 25 ppm to 300 ppm, and still more preferably from 100 ppm to 300 ppm of the polyalkylene glycol and from 10 ppm to 500 ppm, more preferably from 25 ppm to 300 ppm, and still more preferably from 100 ppm to 300 ppm of the polyalkylene oxide, based on the amount of polymer.

In another embodiment of the present invention, the co-additive includes a sterically hindered amine and a polyalkylene glycol or a polyalkylene oxide. In a preferred embodiment, the composition of the present invention includes from 5 ppm to 200 ppm, more preferably from 10 to 100 ppm, and still more preferably from 25 ppm to 50 ppm of the sterically hindered amine and from 10 ppm to 500 ppm, more preferably from 25 ppm to 300 ppm, and still more preferably from 100 ppm to 300 ppm of the polyalkylene glycol or polyalkylene oxide, based on the amount of polymer.

In a further embodiment of the present invention, the co-additive includes a sterically hindered amine, polyalkylene glycol and a polyalkylene oxide. In a preferred embodiment, the composition of the present invention includes from 5 ppm to 200 ppm, more preferably from 10 to 100 ppm, and still more preferably from 25 ppm to 50 ppm of the sterically hindered amine, from 10 ppm to 500 ppm, more preferably from 25 ppm to 300 ppm and still more preferably from 100 ppm to 300 ppm of the polyalkylene glycol and from 10 ppm to 500 ppm, more preferably from 25 ppm to 300 ppm, and still more preferably from 100 ppm to 300 ppm of the polyalkylene oxide, based on the amount of polymer.

The stabilized thermoplastic polymer compositions of the invention may optionally also contain various conventional additives, such as (1) antioxidants, such as, e.g., alkylated monophenols, alkylated hydroquinones, hydroxylated thiodiphenyl ethers, alkylidene-bisphenols, benzyl compounds, acylaminophenols, esters of beta-(3,5-di-tert-butyl-4-hydroxyphenol)-propionic acid with monohydric or polyhydric alcohols, esters of beta-(5-tert-butyl-4-hydroxy-3-methylphenyl)-propionic acid with monohydric or polyhydric alcohols, esters of beta-(5-tert-butyl-4hydroxy-3-methylphenyl) propionic acid with mono-or polyhydric alcohols, amides of beta-(3,5-di-tert-butyl-4-hydroxyphenol)-propionic acid; (2) UV absorbers and light stabilizers such as, e.g., (i) 2-(2'-hydroxyphenyl)-benzotriazoles, 2-Hydroxy-benzophenones; (ii) esters of substituted and unsubstituted benzoic acids, (iii) acrylates, (iv) nickel compounds; (3) metal deactivators, such as, e.g., N,N'-diphenyloxalic acid diamide, 3-salicyloylamino-1,2,4-triazole; (4) peroxide scavengers, such as, e.g., ($C_{10}$–$C_{20}$) alkyl esters of β-thiodipropionic acid, mercapto benzimidazole;(5) polyamide stabilizers; (6) basic co-stabilizers, such as, e.g., melamine, polyvinylpyrrolidone, triallyl cyanurate; urea derivatives, hydrazine derivatives; amines, polyamides, polyurethanes; (7) nucleating agents; such as, e.g., adipic acid; (8) fillers and reinforcing agents, such as, e.g., silicates, glass fibers, carbon black, graphite; and (9) other additives such as, e.g., plasticizers, optical brighteners; flameproofing agents; antistatic agents; blowing agents.

The composition of the present invention is made by combining and mixing, preferably melt mixing, the components of the composition. In a preferred embodiment, the components are combined and mechanically mixed, the mixture so formed is then fed to an extruder and extruded and the extrudate is then pelletized.

The composition of the present invention is useful as a molding or extruding material in applications for which known polyolefin polymers are typically used, e.g., extruded pipe, containers, films, and is particularly well suited for applications wherein exposure to conditions of elevated temperature and/or high relative humidity is anticipated.

EXAMPLES 1–14

The following materials were used to make the thermoplastic polymer compositions of Examples 1–14:

"HDPE": FA 53-035 high density polyethylene, melt index (high load) of about 6 g/10 min (Paxon Polymer Company);

"Phosphite": Bis(2,4di-t-butyl)pentaerythritol diphosphite ULTRANOX™ 626 antioxidant (GE Specialty Chemicals, Inc.);

"Antioxidant": Polyphenol antioxidant, tetrakis(methylene (3,5-di-t-butyl-4-hydroxyhydrocinnamate, IRGANOX™ 1010 antioxidant (Ciba-Geigy);

"Amine": reaction product of 2,4-dichloro-6-(4-morpholinyl)-1,3,5-triazine with a polymer of 1,6-diamine, N, N'-Bis(-2,2,4,6-tetramethyl-4-piperidenyl) hexane, CYASORB™3346 LD light stabilizer, (Cytec);

"Neutralizer" zinc stearate;

"PEG 3350": CARBOWAX™ 3350 polyethylene glycol, $M_n$=3350 (Union Carbide Company);

"PEG 8000": PLURACOL™ E800 polyethylene glycol, $M_n$=8000 (BASF);

"PEG 20000": POLYGLYKOL™ 20000S polyethylene glycol, $M_n$=20,000 (Hoechst);

"PEG Distearate": Polyethylene glycol 400 Distearate (Aldrich);

"PEG Methyl Ether": Polyethylene glycol 750 Methyl Ether (Aldrich)

"PE Oxide" Polyethylene oxide, $M_v$=100,000 (Aldrich)

"TIPA" triisopropanol amine (Aldrich)

The compositions of Examples 1–14 were each made by combining the respective components in a single screw extruder and pelletized. Each of the compositions of Examples 1–14 included 100 pbw HDPE, 1000 ppm Phosphite and 500 ppm Antioxidant. The Neutralizer, Amine, PE Oxide, PEG 3350, PEG 8000, PEG 20000, PEG distearate, PEG methyl ether and TIPA were added to the respective compositions in the amounts set forth below in TABLE 1.

TABLE 1

| EX # | Neutralizer | PEG 8000 | PEG 20000 | Amine | PE Oxide |
|---|---|---|---|---|---|
| 1 | 400 | 50 | — | — | — |
| 2 | 400 | 100 | — | — | — |
| 3 | 400 | 200 | — | — | — |
| 4 | 400 | — | — | — | — |
| 5 | 400 | — | 100 | — | — |
| 6 | — | — | 200 | — | — |
| 7 | 400 | — | 200 | — | — |
| 8 | 400 | — | — | 100 | — |
| 9 | 400 | — | — | 50 | — |
| 10 | 400 | — | — | — | 200 |

| EX # | Neutralizer | PEG Distearate | PEG Methyl Ether | PEG 3350 | TIPA |
|---|---|---|---|---|---|
| 11 | 400 | 200 | — | — | — |
| 12 | 400 | — | 200 | — | — |
| 13 | 400 | — | — | 200 | — |
| 15 | 400 | — | — | — | 200 |

The color of each of the compositions of Examples 1–14 was determined as Hunter YI color index (yellowness, as measured using the Hunter YI scale). A lower Hunter YI color index number indicates lower color, with results of 0.0 or lower being preferred and results in the range of about −0.1 being highly preferred. Each of the compositions was subjected to aging at 60° C. and 85–100% relative humidity ("RH") and the phosphite level of each of the compositions was monitored by Fourier transform infrared spectroscopy (FTIR).

Test results for each of the compositions of Examples 1–14 are set forth below in TABLE 2 as Hunter YI color index ("Color") and phosphite level ("Phosphite (ppm)") at room temperature ("RT") and under humid, i.e., 60° C. and 85–100% RH, conditions ("HUMID") versus aging time ("t (days)").

TABLE 2

| Ex# | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Color | −1.4 | −0.7 | −0.1 | 0.0 | −1.0 | −0.5 | −1.2 | −0.3 | 0.4 | 0.3 | −0.8 | −0.3 | 1.0 | −1.1 |
| Phosphite (ppm) @ t (days), RT | | | | | | | | | | | | | | |
| t = 0 | 778 | 623 | 610 | 737 | 684 | 697 | 684 | 699 | 701 | 589 | 686 | 725 | 693 | 704 |
| t = 7 | 721 | 646 | 635 | 648 | 702 | 587 | 688 | 753 | 741 | 832 | 665 | 701 | 691 | 490 |
| t = 28 | 734 | 694 | 608 | 646 | 672 | 0 | 684 | 745 | 739 | 685 | 677 | 705 | 641 | — |
| Phosphite (ppm) @ t (days), HUMID | | | | | | | | | | | | | | |
| t = 0 | 775 | 688 | 666 | 717 | 660 | 691 | 713 | 760 | 719 | 690 | 658 | 760 | 670 | 749 |
| t = 7 | 0 | 117 | 649 | 656 | 0 | 0 | 634 | 705 | 672 | 523 | 639 | 202 | 0 | 756 |
| t = 21 | — | 427 | 610 | 0 | — | — | 559 | 512 | 648 | 0 | 0 | 0 | — | 640 |
| t = 28 | — | 415 | 554 | — | — | — | 545 | 419 | 559 | — | — | — | — | — |
| t = 40 | — | 289 | 562 | — | — | — | 418 | 281 | 279 | — | — | — | — | — |

The thermoplastic polymer composition of the present invention exhibits advantageously low color and exhibits a substantial decrease, relative to analogous compositions that lack the co-additive of the composition of the present invention, in the rate at which the phosphorus-containing antioxidant compound disappears from the composition, particularly under conditionsof conditions of elevated temperature, high relative humidity or elevated temperature and high relative humidity.

What is claimed is:

1. A thermoplastic polymer composition comprising:
    a polyolefin polymer;
    silica;
    a phosphorus-containing antioxidant compound;
    a neutralizer compound; and
    a co-additive, said co-additive comprising one or more of (i) a polyalkylene glycol having a number average molecular weight of greater than or equal to 3,000, (ii) a polyalkylene oxide, and (iii) a sterically hindered amine compound.

2. The composition of claim 1, wherein the composition comprises from 20 parts by weight to 1000 parts by weight silica per one million parts by weight polymer.

3. The composition of claim 1, wherein the composition comprises from 100 parts by weight to 2000 parts by weight of the phosphorus-containing antioxidant compound per one million parts by weight polymer.

4. The composition of claim 1, wherein the composition comprises from 10 parts by weight to 500 parts by weight of a polyalkylene glycol having a molecular weight of greater than or equal to 3,000 per one million parts by weight polymer.

5. The composition of claim 1, wherein the composition comprises from 10 parts by weight to 500 parts by weight of a polyalkylene oxide per one million parts by weight polymer.

6. The composition of claim 1, wherein the composition comprises from 5 parts by weight to 200 parts by weight of the sterically hindered amine compound per one million parts by weight polymer.

7. The composition of claim 1, wherein the composition comprises from 10 parts by weight to 500 parts by weight of the polyalkylene glycol or a polyadlylene oxide and from 5 parts by weight to 200 parts by weight of the sterically hindered amine compound, based on one million parts by weight polymer.

8. The composition of claim 1, wherein the polyolefin polymer is a high density polyethylene polymer or a high density polyethylene copolymer.

9. The composition of claim 1, wherein the phosphorus-containing antioxidant compound is tris(nonyl-phenyl) phosphite, (2,4,6-tri-tert-butylphenyl)(2-butyl-2-ethyl-1,3-propanediol)phosphite, bis(2,4-di-t-butylphenyl) pentaerythritol diphosphite or distearyl pentaerythritol diphosphite.

10. The composition of claim 1, wherein the co-additive comprises a polyethylene glycol, a polypropylene glycol, a polyethylene oxide or a polypropylene oxide.

11. The composition of claim 1, wherein the co-additive comprises triisopropanol amine or the reaction product of 2,4-dichloro-6-(4-morpholinyl)-1,3,5-triazine with a polymer of 1,6-diamine, N,N'-Bis(-2,2,4,6-tetramethyl-4-piperidenyl) hexane.

12. The composition of claim 1, wherein the co-additive is triisopropanol amine or the reaction product of 2,4-dichloro-6-(4-morpholinyl)-1,3,5-triazine with a polymer of 1,6-diamine, N,N'-bis(-2,2,4,6-tetramethyl-4-piperidenyl) hexane.

13. The composition of claim 1, wherein the co-additive is a polyalkylene oxide.

14. The composition of claim 1, wherein the co-additive is a polyalkylene oxide and a sterically hindered amine compound.

15. The composition of claim 1, wherein said polyolefin polymer composition has a greater retention of said phosphorus-containing antioxidant compound after 21 days at 60° C. and 85–100% relative humidity than the same composition not containing the neutralizer compound or the co-additive.

16. A thermoplastic polymer composition consisting essentially of:
    a polyolefin polymer;
    silica;
    a phosphorus-containing antioxidant compound;
    a neutralizer compound; and
    a co-additive, said co-additive consisting essentially of one or more of (i) a polyalkylene glycol having a number average molecular weight of greater than or equal to 3,000, (ii) a polyalkylene oxide, and (iii) a sterically hindered amine compound.

17. The composition of claim 16, wherein the co-additive is triisopropanol amine or the reaction product of 2,4dichloro-6-(4-morpholinyl)-1,3,5-triazine with a polymer of 1,6-diamine, N,N'-bis(-2,2,4,6-tetramethyl-4-piperidenyl) hexane.

18. The composition of claim 16, wherein the co-additive is a polyalkylene oxide.

19. The composition of claim 16, wherein the co-additive is a polyalkylene oxide and a sterically hindered amine compound.

20. The composition of claim 16, wherein the phosphorus-containing antioxidant compound is tris(nonyl-phenyl)phosphite, (2,4,6-tri-tert-butylphenyl)(2-butyl-2-ethyl-1,3-propanediol)phosphite, bis(2,4-di-t-butylphenyl) pentaerythritol diphosphite or distearyl pentaerythritol diphosphite.

21. A method for decreasing the rate of consumption of a phosphorus-containing antioxidant compound in a polyolefin polymer composition, wherein said polyolefin polymer composition initially comprises the phosphorus-containing antioxidant compound, a neutralizer compound, and silica, comprising:
  adding a co-additive to the polymer composition, said co-additive comprising one or more of: (i) a polyalkylene glycol having a number average molecular weight of greater than or equal to 3,000, (ii) a polyalkylene oxide, and (iii) a sterically hindered amine compound, to the polyolefin polymer composition.

22. The method of claim 21, wherein the co-additive is a polyalkylene oxide and a sterically hindered amine compound.

23. The method of claim 21, wherein the co-additive is a polyalkylene oxide.

24. The method of claim 21, wherein the co-additive is a sterically hindered amine compound.

25. The method of claim 21, wherein said polyolefin polymer composition has a greater retention of said phosphorus-containing antioxidant compound after 21 days at: 60° C. and 85–100% relative humidity than the same composition not containing the neutralizer compound or the co-additive.

26. The method of claim 25, wherein the phosphorus-containing antioxidant compound is tris(nonyl-phenyl)phosphite, (2,4,6-tri-tert-butylphenyl)(2-butyl-2-ethyl-1,3-propanediol)phosphite, bis(2,4-di-t-butylphenyl) pentaerytbritol diphosphite or distearyl pentaerythritol diphosphite.

27. A method for decreasing the rate of consumption of a phosphorus-containing antioxidant compound in a polyolefin polymer composition, wherein said polyolefin polymer composition initially consists essentially of the phosphorus-containing antioxidant compound, a neutralizer compound, and silica, consisting essentially of:
  adding a co-additive to the polymer composition, said co-additive consisting essentially of one or more of:
   (i) a polyalkylene glycol having a number average molecular weight of greater than or equal to 3,000,
   (ii) a polyalkylene oxide, and
   (iii) a sterically hindered amine compound, to the polyolefin polymer composition.

28. The method of claim 27, wherein the co-additive is a polyalkylene oxide and a sterically hindered amine compound.

29. The method of claim 27, wherein the co-additive is a polyalkylene oxide.

30. The method of claim 27, wherein the co-additive is a sterically hindered amine compound.

31. The method of claim 27, wherein the phosphorus-containing antioxidant compound is tris(nonyl-phenyl)phosphite, (2,4,6-tri-tert-butylphenyl)(2-butyl-2-ethyl-1,3-propanediol)phosphite, bis(2,4-di-t-butylphenyl) pentaerythritol diphosphite or distearyl pentaerythritol diphosphite.

* * * * *